(12) United States Patent
Meng et al.

(10) Patent No.: US 11,816,847 B2
(45) Date of Patent: Nov. 14, 2023

(54) METHOD AND APPARATUS FOR PROMPTING MOTION, ELECTRONIC DEVICE AND STORAGE MEDIUM

(71) Applicant: Beijing Baidu Netcom Science and Technology Co., Ltd., Beijing (CN)

(72) Inventors: Qingyue Meng, Beijing (CN); Chen Zhao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 412 days.

(21) Appl. No.: 17/193,214

(22) Filed: Mar. 5, 2021

(65) Prior Publication Data
US 2021/0319213 A1 Oct. 14, 2021

(30) Foreign Application Priority Data

Apr. 9, 2020 (CN) .......................... 202010274415.3

(51) Int. Cl.
| | |
|---|---|
| *G06V 40/20* | (2022.01) |
| *G06T 7/246* | (2017.01) |
| *G06V 20/64* | (2022.01) |
| *G06F 18/214* | (2023.01) |
| *G06V 40/10* | (2022.01) |

(Continued)

(52) U.S. Cl.
CPC ............ *G06T 7/251* (2017.01); *G06F 18/214* (2023.01); *G06N 3/08* (2013.01); *G06V 10/774* (2022.01); *G06V 20/647* (2022.01); *G06V 40/103* (2022.01); *G06V 40/23* (2022.01); *G06T 2207/10024* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

2020/0320283 A1* 10/2020 Lee ........................... G06T 7/20
2022/0176200 A1* 6/2022 Jiang .................. A63B 24/0021

OTHER PUBLICATIONS

Dorado, Javier, et al. "A computer-vision-based system for at-home rheumatoid arthritis rehabilitation." International Journal of Distributed Sensor Networks 15.9 (2019): 1550147719875649. (Year: 2019).*

(Continued)

*Primary Examiner* — Sean M Conner
(74) *Attorney, Agent, or Firm* — Ice Miller LLP

(57) ABSTRACT

A method and apparatus for promoting a motion, an electronic device and a storage medium, relating to the field of image recognition technology are provided. An embodiment of the method may include: acquiring a user motion image, and acquiring three-dimensional recognition coordinates of body key points recognized in the user motion image; determining, based on the three-dimensional recognition coordinates, a user motion matching the user motion image; screening, according to a mapping relationship between user motion and body key points, a target body key point among all of the recognized body key points; acquiring three-dimensional standard coordinates of the target body key point corresponding to the user motion; and prompting a motion based on values of differences between the three-dimensional standard coordinates of the target body key point and the three-dimensional recognition coordinates of the target body key point.

15 Claims, 5 Drawing Sheets

(51) Int. Cl.
*G06N 3/08* (2023.01)
*G06V 10/774* (2022.01)

(56) References Cited

OTHER PUBLICATIONS

Toshev, Alexander, and Christian Szegedy. "Deeppose: Human pose estimation via deep neural networks." Proceedings of the IEEE conference on computer vision and pattern recognition. 2014. (Year: 2014).*

Sánchez, Daniel, et al. "Multi-task human analysis in still images: 2D/3D pose, depth map, and multi-part segmentation." 2019 14th IEEE International Conference on Automatic Face & Gesture Recognition (FG 2019). IEEE, 2019. (Year: 2019).*

* cited by examiner

METHOD AND APPARATUS FOR PROMPTING MOTION, ELECTRONIC DEVICE AND STORAGE MEDIUM

CROSS-REFERENCE TO RELATED APPLICATIONS

This application claims priority to Chinese Patent Application No. 202010274415.3, filed with the China National Intellectual Property Administration (CNIPA) on Apr. 9, 2020, the content of which is incorporated herein by reference in its entirety.

TECHNICAL FIELD

Embodiments of the present disclosure relate to the field of image processing technology, particularly to the field of image recognition technology, and particularly to a method and apparatus for prompting a motion, an electronic device and a storage medium.

BACKGROUND

At present, more and more people have health awareness and take the initiative to exercise. In application scenarios where a user exercises without a fitness trainer but through video images, the user cannot accurately know whether his or her motions are standard and whether the motions can achieve the purpose of effective fitness.

SUMMARY

Embodiments of the present disclosure provide a method and apparatus for prompting a motion, an electronic device ad storage medium, so that effective motion prompting is provided to the user during exercise.

According to a first aspect, some embodiments of the present disclosure provide a method for prompting a motion. The method includes:

acquiring a user motion image, and acquiring three-dimensional recognition coordinates of body key points recognized in the user motion image;

determining, based on the three-dimensional recognition coordinates, a user motion matching the user motion image;

screening, according to a mapping relationship between the user motion and body key points, a target body key point among all of the recognized body key points;

acquiring three-dimensional standard coordinates of the target body key point corresponding to the user motion;

prompting a motion based on values of differences between the three-dimensional standard coordinates of the target body key point and the three-dimensional recognition coordinates of the target body key point.

In addition, the method for prompting a motion according to above embodiment of the present disclosure further includes:

Alternatively, before acquiring the user motion image, the method further includes:

collecting an image in real time, and recognizing a body in the collected image to obtain a body recognition result;

where, the body recognition result includes: whether a body is contained, and a body recognition position;

in response to determining that the body recognition result of a target image contains a body, capturing the user motion image from the target image according to the body recognition position matching the target image.

Alternatively, the recognizing the body in the collected image to obtain the body recognition result, includes:

inputting the image into a pre-trained body recognition model, to obtain the body recognition result output by the body recognition model;

where the body recognition model is obtained by training a preset deep learning model with training images pre-labeled with body positions.

Alternatively, the user motion image is a color image;

the acquiring the three-dimensional recognition coordinates of the body key points in the user motion image includes:

inputting the user motion image into a pre-trained three-dimensional joint point regression model, to obtain a heat map set of the body key points and a depth information map set of the body key points output by the three-dimensional joint point regression model;

combining two-dimensional image information of each body key point in the heat map set of the body key points with depth information of each body key point in the depth information map set of the body key points, to obtain the three-dimensional recognition coordinates of the body key points.

Alternatively, before inputting the user motion image into the pre-trained three-dimensional joint point regression model, the method further includes:

acquiring sample images with two-dimensional labels and sample images with three-dimensional labels;

training part of channels in an output layer of a basic three-dimensional joint point regression model, with the sample images with the two-dimensional labels as first inputs, and with a set of joint point heat maps corresponding to the two-dimensional labels as first expected outputs;

training all of the channels in the output layer of the basic three-dimensional joint point regression model to obtain the three-dimensional joint point regression model, with the sample images with three-dimensional labels as second inputs, and with a set of joint point heat maps corresponding to the three-dimensional labels as first parts of second expected outputs, and with a set of joint point depth information maps corresponding to the three-dimensional labels as second parts of the second expected outputs.

Alternatively, the determining, based on the three-dimensional recognition coordinates, a user motion matching the user motion image includes:

selecting a reference body key point from the body key points;

calculating, based on the three-dimensional recognition coordinates, a set of three-dimensional coordinate differences of the body key points relative to the reference body key point;

matching the set of three-dimensional coordinate differences with sets of standard three-dimensional coordinate differences of respective motions, and determining the user motion matching the user motion image based on the matching result.

Alternatively, the prompting the motion based on difference values between the three-dimensional standard coordinates of the target body key point and the three-dimensional recognition coordinates, includes:

calculating a distance value between the three-dimensional standard coordinates of the target body key point and the three-dimensional recognition coordinates of the target body key point, and screening a different body key point with a distance value greater than a preset threshold;

prompting the motion, based on body position where the different body key point is located, and a degree of deviation between the three-dimensional recognition coordinates of the different body key point and three-dimensional standard coordinates matching the different body key point.

Alternatively, after prompting the motion based on difference values between the three-dimensional standard coordinates of the target body key point and the three-dimensional recognition coordinates, the method further includes:

acquiring a plurality of user motion images matching each motion stage respectively, and performing standard degree scoring on the user motion for each user motion image;

calculating, according to the scoring results, motion scores corresponding to the motion stages;

generating a motion progress curve according to the motion scores respectively corresponding to different motion stages.

According to a second aspect, some embodiments of the present disclosure provide an apparatus for prompting a motion. The apparatus includes:

a three-dimensional recognition coordinate acquisition module, configured to acquire a user motion image, and acquire three-dimensional recognition coordinates of body key points recognized in the user motion image;

a user motion determination module, configured to determine, based on the three-dimensional recognition coordinates, a user motion matching the user motion image;

a target body key point screening module, configured to screen, according to a mapping relationship between the user motion and body key points, a target body key point among all of the recognized body key points;

a key point and three-dimensional standard coordinate acquisition module, configured to acquire three-dimensional standard coordinates of the target body key point corresponding to the user motion;

a motion prompting module, configured to prompt a motion based on values of differences between the three-dimensional standard coordinates of the target body key point and the three-dimensional recognition coordinates of the target body key point.

According to a third aspect, some embodiments of the present disclosure provide an electronic device. The electronic device includes:

at least one processor; and a memory communicatively connected with the at least one processor; where the memory stores instructions executable by the at least one processor, and the instructions, when executed by the at least one processor, causes the at least one processor to execute the method for prompting a motion according to any one of embodiments of the present disclosure.

According to a fourth aspect, some embodiments of the present disclosure provide a non-transitory computer-readable storage medium storing computer instructions, where the computer instruction are used for a computer to execute the method for prompting a motion according to any one of embodiments of the present disclosure.

Other effects of the above-mentioned optional modes will be described below in conjunction with specific embodiments.

BRIEF DESCRIPTION OF THE DRAWINGS

The accompanying drawings are used to better understand the solution and do not constitute limitations to the present disclosure. In the figures.

DETAILED DESCRIPTION OF EMBODIMENTS

Embodiments of the present disclosure will be described below in combination with the accompanying drawings, which include various details of embodiments of the present disclosure to facilitate understanding and should be regarded as merely exemplary. Therefore, it should be appreciated by those of ordinary skill in the art that various changes and modifications can be made to the embodiments described here without departing from the scope and spirit of the present disclosure. Likewise, for clarity and conciseness, descriptions of well-known functions and structures are omitted in the following description.

First Embodiment

Figure 1:
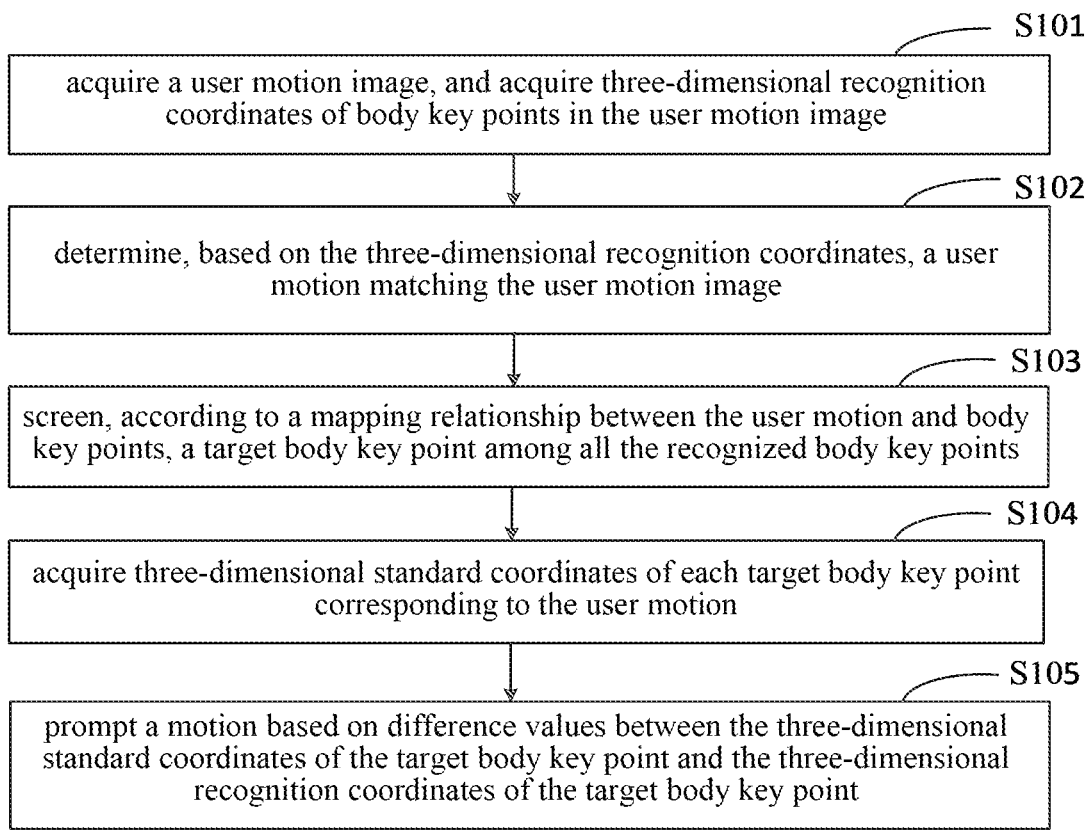
FIG. 1 is a schematic flowchart of a method for prompting a motion according to a first embodiment of the present disclosure.

FIG. 1 is a schematic flowchart of a method for prompting a motion according to a first embodiment of the present disclosure. This embodiment may be used in health training to correct user's wrong motions. The method may be executed by an apparatus for prompting a motion. The apparatus may be implemented by means of software and/or hardware, and is generally integrated into an electronic device with image capture function (for example, a mobile phone, a tablet computer, or a desktop computer), or an electronic device used in conjunction with an image capture device (camera). As shown in FIG. 1, a method for prompting a motion according to this embodiment may include:

S101: acquiring a user motion image, and acquiring three-dimensional recognition coordinates of body key points in the user motion image.

In an embodiment, the user motion image may be captured by a separate image capture device, and may also be captured by a color camera configured in an electronic device. The image capture device may be a video camera or a camera. The three-dimensional recognition coordinates of each body key point refer to three-dimensional coordinates of each body key point of a user recognized in the user motion image.

Exemplarily, the body key points may include: key points that match the positions of the left knee, right knee, left toes, right toes, left hand fingers, right hand fingers, neck, and/or left and right part of the crotch. The three-dimensional recognition coordinates of a body key point may include: two-dimensional image coordinates of the body key point in the user motion image, and a depth coordinate of the body key point in an actual physical space; or, the three-dimensional recognition coordinates may be world coordinates of the body key point in a world coordinate system, and the like.

In an embodiment, three-dimensional feature information in two-dimensional images may be obtained by learning from a large number of user motion images which are labeled with three-dimensional coordinates of body key points, and then the three-dimensional recognition coordinates of each body key point corresponding to the currently input user motion image may be determined based on the three-dimensional feature information.

Correspondingly, the mode of acquiring three-dimensional recognition coordinates of each body key point in the user motion image may include:

inputting the user motion image into a pre-trained three-dimensional coordinate recognition model to obtain the three-dimensional recognition coordinates of each body key point. Typically, the three-dimensional coordinate recognition model may be obtained by training with a large number of user motion images labeled with three-dimensional coordinates of body key points.

The model parameters of the three-dimensional coordinate recognition model and the model training mode may be preset according to actual conditions.

Of course, it is understandable that other modes may also be used to acquire the three-dimensional recognition coordinates of each body key point in the user motion image. For example, each body key point is first recognized in the user motion image by means of key point recognition; and then through a mapping relationship between a pre-calibrated camera coordinate system and a world coordinate system, world coordinates of each body key point in the user motion image are calculated and then used as the three-dimensional recognition coordinates. The model training mode is not limited herein.

S102: determining, based on the three-dimensional recognition coordinates, a user motion matching the user motion image.

In an embodiment, the user motion matching the user motion image refers to a motion currently performed by the user.

It is understandable that, during exercise training, when the user performs a motion, the body key points should theoretically be at a set and predictable spatial position, or the relative position relationship between the body key points should be predictable. Therefore, a mapping relationship between each user motion and theoretical positions or theoretical relative positions of body key points can be first established, and then the user motion matching the user motion image is determined based on the three-dimensional recognition coordinates.

S103: screening, according to a mapping relationship between the user motion and body key points, a target body key point among all the recognized body key points.

In an embodiment, considering that for different user motions, the body key points that need to be focused on are not the same. For example, if the user mainly performs a hand motion, the body key points that need to be focused on are mainly located at the hand area. When the user performs a leg motion, the body key points that need to be focused on are mainly located at the lower body area. Therefore, in order to make subsequent calculations easier and faster, mapping relationships between various user motions and body key points that need to be focused on, that is, the mapping relationships between user motions and body key points, may be pre-established.

The mapping relationships are in one-to-one correspondence, that is, different user motions correspond to different body key points. A target body key point refer to the more important body key point in a user motion, and the target body key points are constant in different motions.

S104: acquiring three-dimensional standard coordinates of each target body key point corresponding to the user motion.

In an embodiment, for each user motion, the three-dimensional standard coordinates of each target body key point are first determined, that is, the three-dimensional standard coordinates refer to three-dimensional coordinates of each target body key point when the user motion is a standard motion.

S105: prompting a motion based on difference values between the three-dimensional standard coordinates of the target body key point and the three-dimensional recognition coordinates of the target body key point.

In an embodiment, the difference values between the three-dimensional standard coordinates of the target body key point and the three-dimensional recognition coordinates of the target body key point are the differences of values corresponding to the three-dimensional coordinates. The greater the difference values are, the less standard the user's current motion is.

An embodiment in the above application has the following advantages or beneficial effects: a user motion is recognized, and the values of the differences between target body key points in the user motion and three-dimensional standard recognition coordinates are determined, so that the difference from a standard motion during user's actual motion can be determined, a non-standard motion appearing in the user motions can be prompted, and the user can correct the motion according to the prompt.

Second Embodiment

Figure 2:
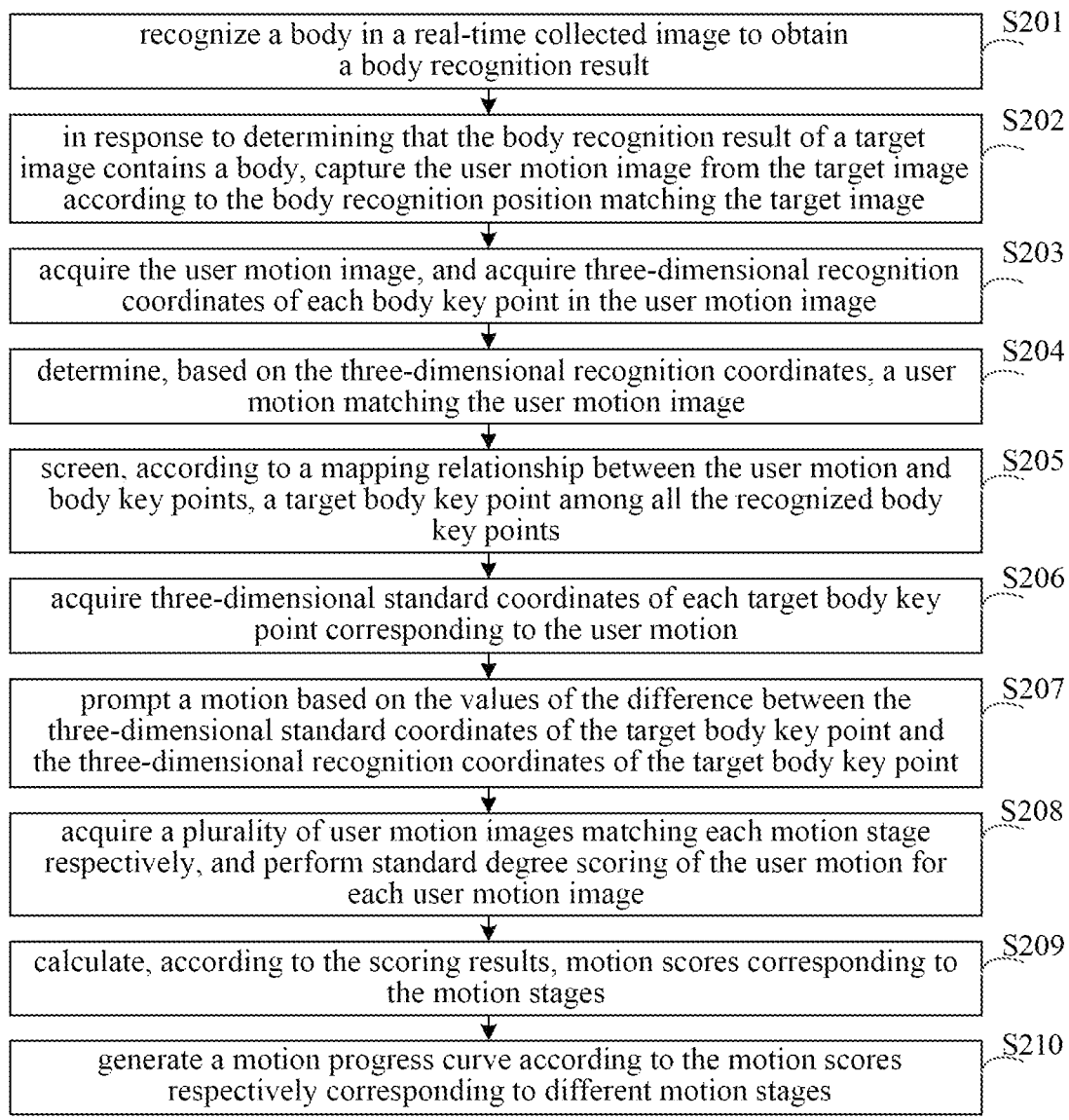
FIG. 2 is a schematic flowchart of a method for prompting a motion according to a second embodiment of the present disclosure.

FIG. 2 is a schematic flowchart of a method for prompting a motion according to a second embodiment of the present disclosure. This embodiment may be used in health training to correct user's wrong motion. The method may be executed by an apparatus for prompting a motion. The apparatus may be implemented by means of software and/or hardware, and is generally integrated into an electronic device. As shown in FIG. 2, a method for prompting a motion according to this embodiment may include:

S201: recognizing a body in a real-time collected image to obtain a body recognition result.

In an embodiment of the present disclosure, user motion images are collected in real time, and then the collected images are analyzed. The body recognition result include: whether a body is contained, and a body recognition position.

The body recognition position refers to, after an image is determined to contain a body, a position of the recognized body in the image, or a coordinate range of the recognized body in the image.

The advantage of this configuration is, the user does not need to stand at a specified position for the user's motion to be recognized, so that the user's motion is freer, the range of motion is large, and the versatility of the method is improved.

Alternatively, the performing body recognition on the real-time collected image to obtain the body recognition result may include:

inputting the image into a pre-trained body recognition model, to obtain the body recognition results output by the body recognition model;

wherein the body recognition model is obtained by training a preset deep learning model with training images pre-labeled with body positions.

In an embodiment, by inputting the image into the pre-trained body recognition model, whether the image contains a body can be accurately determined, and different positions of the body can be labeled.

The deep learning model may be a CNN (Convolutional Neural Network) or an RNN (Recurrent Neural Network).

The convolutional neural network is a type of feedforward neural network that includes convolutional calculation and has a deep structure, and is one of the representative algorithms of deep learning. The convolutional neural network has the ability to learning the characterization of data, and can perform translation invariant classification on input information according to its hierarchical structure, and therefore, it is also called "translation invariant artificial neural network". The recurrent neural network is a type of recursive neural network into which sequence data is input, which performs recursion in the evolution direction of a sequence, and in which all nodes are connected in a chain.

In the embodiment, whether an image includes a body can be determined more accurately through the pre-trained body recognition model, thereby improving the accuracy of body recognition.

S202, in response to determining that the body recognition result of a target image contains a body, capturing the user motion image from the target image according to the body recognition position matching the target image.

In an embodiment, the target image is an image capable of presenting user motion, and the target image is an image including surrounding environment information. After it recognizes that the target image contains a body, the position of the user in the target image can be determined, and the user motion image can be obtained, where the user motion image does not include surrounding environment information and environmental images. Particularly, the user motion image may be captured from the target image by means of screenshot along user's contour or along the largest bounding rectangle of the user's contour.

S203: acquiring the user motion image, and acquiring three-dimensional recognition coordinates of each body key point in the user motion image.

S204: determining, based on the three-dimensional recognition coordinates, a user motion matching the user motion image.

S205: screening, according to a mapping relationship between the user motion and body key points, a target body key point among all the recognized body key points.

S206: acquiring three-dimensional standard coordinates of each target body key point corresponding to the user motion.

S207: prompting a motion based on the values of the difference between the three-dimensional standard coordinates of the target body key point and the three-dimensional recognition coordinates of the target body key point.

S208: acquiring a plurality of user motion images matching each motion stage respectively, and performing standard degree scoring of the user motion for each user motion image.

In an embodiment, the motion stage may be the motion stage at different times of a same day, or the motion stage of the user at a set time in every day, such as every night. The standard degree score is an indicator used to measure whether the user motion is standard, and may be a specific value or a percentage. The user motion can be recorded in detail by scoring the plurality of user motion images acquired.

S209: calculating, according to the scoring results, motion scores corresponding to the motion stages.

The motion score is user's final score at a motion stage. Illustratively, within one hour of user's exercise every night, the user's motion images in this hour are scored by the standard degree, and several images are randomly selected for solving an average value to obtain the corresponding motion score of the user in this motion stage.

S210: generating a motion progress curve according to the motion scores respectively corresponding to different motion stages.

In an embodiment, the motion progress curve can show the achievement achieved by the user in a motion stage. The motion progress curve can be generated at a constant time, for example, generated once every three months. This embodiment can record user's exercise time and status, so that the user can more easily see the achievements of persisting in exercise, and the user can be motivated more easily to persist in the exercise.

An embodiment in the above description has the following advantages or beneficial effects: whether an image includes a body and a position of the body in the image can be determined after the image is acquired, so that the user does not have to be restricted to a fixed area; meanwhile, this embodiment may record the user's exercise time and status, so that the user can more easily seethe achievements of persisting in exercise, and the user can be motivated more easily to persist in the exercise.

Third Embodiment

Figure 3:
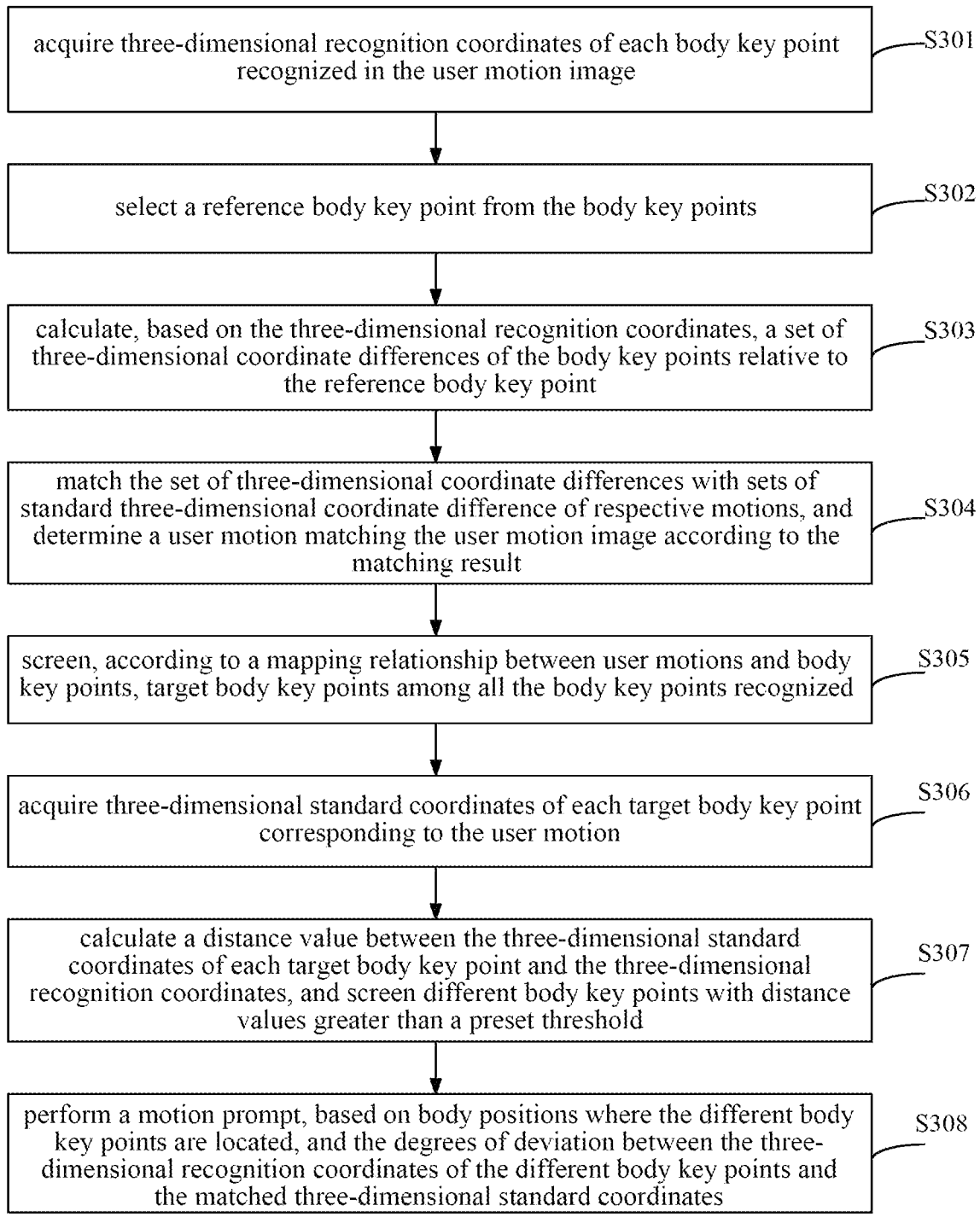
FIG. 3 is a schematic flowchart of a method for prompting a motion according to a third embodiment of the present disclosure.

FIG. 3 is a schematic flowchart of a method for prompting a motion according to a third embodiment of the present disclosure. This embodiment may be used in health training to correct user's wrong motion. The method may be executed by an apparatus for prompting a motion. The apparatus may be implemented by means of software and/or hardware, and is generally integrated into an electronic device. As shown in FIG. 3, a method for prompting a motion according to this embodiment may include:

S301: acquiring three-dimensional recognition coordinates of each body key point recognized in the user motion image.

In an embodiment, the user motion image may be a color image.

In the embodiment, the acquiring three-dimensional recognition coordinates of each body key point in a user motion image may include:

inputting the user motion image into a pre-trained three-dimensional joint point regression model, to obtain a heat map set of the body key points and a depth information map set of the body key points output by the three-dimensional joint point regression model; and combining two-dimensional image information of each body key point in the heat map set of the body key points with depth information of each body key point in the depth information map set of the body key points, to obtain the three-dimensional recognition coordinates of the body key points.

In an embodiment, the three-dimensional joint point regression model is used to recognize each body key point in the user motion image. The heat map set of the body key points refers to a set of images in which body key points are marked in a special highlight form. The depth information map set of the body key points refers to a set of images in which depth information of flexion and extension of body key points is marked.

In the embodiment, the two-dimensional image information of the body key points may be determined from the heat map set of the body key points. A coordinate system may be established in each heat map of the body key points. By combining the two-dimensional image information with the depth information of each body key point, three-dimensional information of each body key point may be obtained, and the three-dimensional recognition coordinates of each body key point may be obtained. By inputting the user motion image into the three-dimensional joint point regression model, the three-dimensional recognition coordinates of each body key point of the user can be obtained, and then the pose and amplitude of each motion of the user can be accurately known.

Before inputting the user motion image into the pre-trained three-dimensional joint point regression model, the method further includes:

acquiring sample images with two-dimensional labels and sample images with three-dimensional labels;

training part of the channels in the output layer of a basic three-dimensional joint point regression model, with the sample images with two-dimensional labels as first inputs, and with a set of joint point heat maps corresponding to the two-dimensional labels as first expected outputs; and training all of the channels in the output layer of the basic three-dimensional joint point regression model to obtain the three-dimensional joint point regression model, with the sample images with three-dimensional labels as second inputs, and with a set of joint point heat maps corresponding to the three-dimensional labels as the first parts of the second desired outputs, and a set of joint point depth information maps corresponding to the three-dimensional labels as second parts of the second expected outputs.

In an embodiment, the execution body of the method for generating the three-dimensional joint point regression model may acquire the sample images with two-dimensional labels and the sample images with three-dimensional labels locally or from a cloud.

In the embodiment, a sample image with a two-dimensional label refers to a training sample image with a label for labeling two-dimensional coordinates for training the basic three-dimensional joint point regression model. The joint point heat map shows a heat map indicating key points of joints. Part of the channels refer to some convolution kernels in the output layer.

The above-mentioned basic three-dimensional joint point regression model may include any of the following: an initial three-dimensional joint point regression model; or a pre-trained three-dimensional joint point regression model obtained by training the initial three-dimensional joint point regression model using the sample images with two-dimensional labels.

The initial joint point regression model may be implemented by a cascaded hourglass model; or may also be implemented by a Convolutional Pose Machines (CPM) model that learns spatial information and texture information and estimates body pose based on a serialized full convolutional network structure; or may also be implemented by a body pose recognition project model (OpenPose), a body pose estimation model (AlphaPose), or and the like.

Here, after the initial three-dimensional joint point regression model is trained using the sample images with two-dimensional labels to obtain the pre-trained three-dimensional joint point regression model, the pre-trained three-dimensional joint point regression model is used as the basic three-dimensional joint point regression model, which is equivalent to that shallow features are extracted using first few layers of the pre-trained three-dimensional joint point regression model and finally falls into a newly trained class. In this way, it does not need to completely retrain the initial three-dimensional joint point regression model, thereby improving the efficiency of generating the three-dimensional joint point regression model. With the newly trained initial three-dimensional joint point regression model, the accuracy begins to slowly increase from a very low value. With the pre-trained three-dimensional joint point regression model, a better effect can be obtained after fewer iterations.

During training part of the channels in the output layer of the basic three-dimensional joint point regression model with the sample images with two-dimensional labels as first inputs and with a set of joint point heat maps corresponding to the two-dimensional labels as first expected outputs, the training effect may be restrained by a loss function in the prior art or in future developed technologies. For example, one or more of a mean square error loss function, an average absolute error loss function, a Huber loss function, a Log-Cosh loss function, and a quantile loss function may be used as the loss function.

In an example, the pre-trained three-dimensional joint point regression model may be determined by the following steps: training an initial three-dimensional joint point regression model, with the sample images with two-dimensional labels as inputs, with the two-dimensional labels as expected outputs, and with the Euclidean distance between the joint point coordinates determined from the joint point heat map set output by the joint point regression model and the two-dimensional joint point coordinates in the two-dimensional labels as the loss function.

In some alternative implementations of this embodiment, the training part of the channels in the output layer of the basic three-dimensional joint point regression model, with the sample images with two-dimensional labels as first inputs and with the joint point heat map set corresponding to the two-dimensional labels as the first expected outputs includes: training part of the channels in the output layer of the basic three-dimensional joint point regression model, with the sample images with two-dimensional labels as the first inputs, with the set of joint point heat maps corresponding to the two-dimensional labels as the first expected outputs, and with a Huber loss function (of course, other type of loss function, such as a Log-Cosh loss function or a quantile loss function, may also be selected) corresponding to the sample images with two-dimensional labels as a loss function corresponding to the first expected outputs.

In the embodiment, a sample image with a three-dimensional label refer to a training sample image which is attached with a label of three-dimensional coordinates and is for training the basic three-dimensional joint point regression model. The joint point depth information map is an image indicating depth information of the joint points. All of the channels refer to all of the convolution kernels in the output layer. During training all of the channels in the output layer of the basic three-dimensional joint point regression model, with the sample images with three-dimensional labels as the second inputs, with the set of joint point heat maps corresponding to the three-dimensional labels as the first parts of the second expected outputs and with the set of depth information maps corresponding to the three-dimensional labels as the second parts of the second expected outputs, the training effect may be restrained by a loss function in the prior art or in future developed technologies. For example, one or more of a mean square error loss function, an average absolute error loss function, a Huber loss function, a Log-Cosh loss function, and a quantile loss function may be used as the loss function.

In some alternative implementations of this embodiment, the training all of the channels in the output layer of the basic three-dimensional joint point regression model, with the sample images with three-dimensional labels as the second inputs, with the set of joint point heat maps corresponding to the three-dimensional labels as the first parts of a second expected outputs, and with the joint point depth information maps corresponding to the three-dimensional labels as the second parts of the second expected outputs includes: training all of the channels in the output layer of the basic three-dimensional joint point regression model, with the sample images with three-dimensional labels as the second inputs, with the set of joint point heat maps corresponding to the three-dimensional labels as the first parts of the second expected outputs, with the set of joint point depth information maps corresponding to the three-dimensional labels as the second parts of the second expected outputs, with a weighted value of Huber loss functions (of course, other type of loss function, such as a Log-Cosh loss function or a quantile loss function, may also be selected) corresponding to the sample images with three-dimensional labels as a loss function corresponding to the first part of the second expected outputs, and with a weighted value of Euclidean distance loss functions corresponding to the sample images with three-dimensional labels as a loss function corresponding to the second part of the second expected outputs.

In these implementations, by using the set of joint point heat map corresponding to the three-dimensional labels as the first parts of the second expected outputs, with the set of joint point depth information maps corresponding to the three-dimensional labels as the second parts of the second expected outputs, with the weighted value of the Huber loss functions (of course, the other type of loss function, such as a Log-Cosh loss function or a quantile loss function, may also be selected) corresponding to the sample images with three-dimensional labels as the loss function corresponding to the first part of the second expected outputs, and with the weighted value of the Euclidean distance loss functions corresponding to the sample images with three-dimensional labels as the loss function corresponding to the second part of the second expected outputs, to train all the channels in the output layer of the basic three-dimensional joint point regression model, on the basis of training part of the channels in the output layer of the basic three-dimensional joint point regression model with the data with two-dimensional labels, all the channels in the output layer of the basic three-dimensional joint point regression model are further trained by using the sample images with three-dimensional labels, so that the accuracy of output of all the trained channels in the output layer of the basic three-dimensional joint point regression model can be improved after fewer iterations.

In some alterntive implementations of this embodiment, the Euclidean distance loss functions corresponding to the sample images with three-dimensional labels includes: when the sample images with three-dimensional labels are used as the second inputs, Euclidean distances between depth information in the set of joint point depth information maps output by the basic three-dimensional joint point regression model and joint point depth information labeled in the three-dimensional labels.

In these implementations, for sample images fully labeled with three-dimensional coordinate information, Euclidean distances corresponding to the sample images with three-dimensional labels may be first calculated as Euclidean distance loss functions, and then a weighted value of the Euclidean distance loss functions is used as the loss function corresponding to the second parts of the second expected outputs, thereby improving the efficiency of calculating the loss function, and then the efficiency of generating the three-dimensional joint point regression model.

This embodiment may train the joint point regression model with higher predictive ability when the sample images with three-dimensional labels are finite.

S302, selecting a reference body key point from the body key points.

In this embodiment, based on the conclusion that the relative position relationships between the body key points corresponding to different motions should be predictable, for a user motion: standard three-dimensional coordinates of body key points corresponding to the user motion are first determined, then a body key point is selected from the body key points as a fixed point (that is, the reference body key point), and coordinate differences of other body key points relative to this body key point are calculated as a standard three-dimensional coordinate difference set corresponding to the user motion.

In the embodiment, the reference body key point may be randomly selected in all the body key points. Or a body key point located in the middle of the body, such as a hip joint key point or a crotch joint key point, may also be selected as the reference body key point to simplify the calculation of differences, which is not limited herein.

S303: calculating, based on the three-dimensional recognition coordinates, a set of three-dimensional coordinate differences of the body key points relative to the reference body key point.

S304: matching the set of three-dimensional coordinate differences with sets of standard three-dimensional coordinate difference of respective motions, and determining, according to the matching result, a user motion matching the user motion image.

The sets of standard three-dimensional coordinate differences of respective motions refers to sets of differences of three-dimensional coordinates between the body key points in different user motions and the reference body key point. By calculating the differences between the three-dimensional coordinates of all the body key points and the three-dimensional coordinates of the reference body key point, the amplitude and pose of the motion currently performed by the user can be obtained. The magnitude and pose of the motion are matched with the sets of standard three-dimensional coordinate differences, and the high degree of matching is the user motion matching the user motion image.

In the embodiment, the reference body key point is determined from the body key points, the current body motion of the user can be determined according to the difference of three-dimensional coordinates between the reference body key point and each body key point, and the current body motion of the user is matched with standard motions to determine the user motion matching the user.

S305: screening, according to a mapping relationship between user motions and body key points, target body key points among all the body key points recognized.

S306: acquiring three-dimensional standard coordinates of each target body key point corresponding to the user motion.

S307: calculating a distance value between the three-dimensional standard coordinates of each target body key point and the three-dimensional recognition coordinates, and screening different body key points with distance values greater than a preset threshold.

In an embodiment, the threshold may be a system default value, or may be set by the user. For example, if the user conducts preliminary training and the preliminary requirement is to learn a motion, the threshold may be set to be larger. If the user is a professional, the threshold may be set to be smaller.

S308: performing a motion prompt according to body positions where the different body key points are located, and the degrees of deviation between the three-dimensional recognition coordinates of the different body key points and the matched three-dimensional standard coordinates.

In an embodiment, the degree of deviation is used to measure different degrees of up and down, high and low, or left and right deviation of the different body key points from the matched three-dimensional standard coordinates. If it is determined that the position of the arm deviates greatly, the user can be prompted to modify. Exemplarily, if it is determined that the position of the different body key points is the arm, and the degree of deviation is downward deviation, the user may be prompted to raise the arm.

In the embodiment, there is no need to calculate the different body key points of all the body key points, which can reduce the number of comparisons and improve the efficiency of comparison.

Fourth Embodiment

Figure 4:
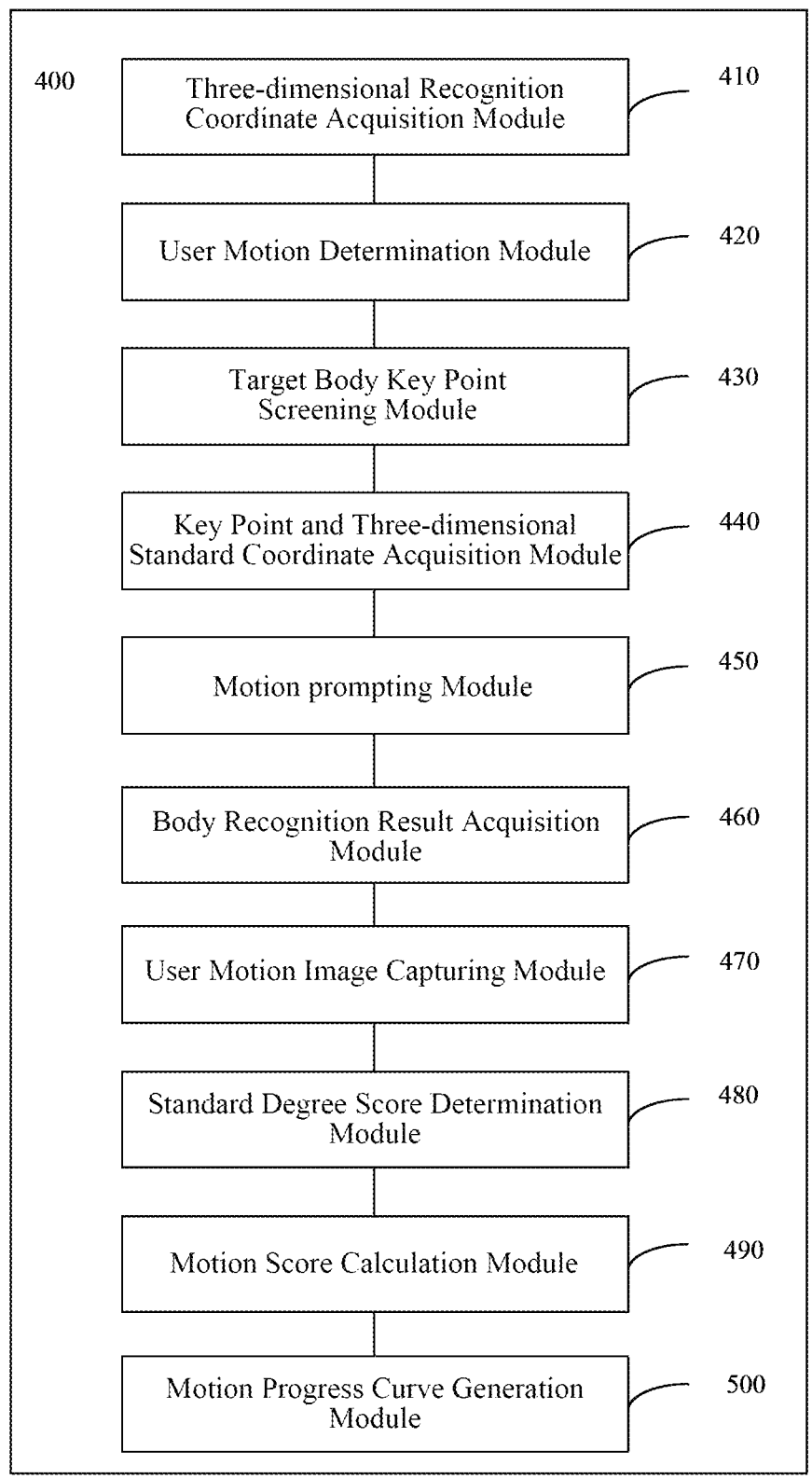
FIG. 4 is a schematic structural diagram of an apparatus for prompting a motion according to a fourth embodiment of the present disclosure.

FIG. 4 is a schematic structural diagram of an apparatus for prompting a motion according to a fourth embodiment of the present disclosure. The apparatus capable of executing the method for prompting a motion according to above embodiments of the present disclosure has corresponding functional modules for executing the method and beneficial effects. As shown in FIG. 4, the apparatus 400 may include:
  a three-dimensional recognition coordinate acquisition module 410, configured to acquire a user motion image, and acquire three-dimensional recognition coordinates of body key points recognized in the user motion image;
  a user motion determination module 420, configured to determine, based on the three-dimensional recognition coordinates, a user motion matching the user motion image;
  a target body key point screening module 430, configured to screen, according to a mapping relationship between the user motion and body key points, a target body key point among all of the recognized body key points;
  a key point and three-dimensional standard coordinate acquisition module 440, configured to acquire three-dimensional standard coordinates of the target body key point corresponding to the user motion; and
  a motion prompting module 450, configured to prompt a motion based on values of differences between the three-dimensional standard coordinates of the target body key point and the three-dimensional recognition coordinates of the target body key point.

In an embodiment, a user motion is recognized, and values of the differences between target body key points in the user motion and three-dimensional standard recognition coordinates are determined, so that the difference from a standard motion during user's actual motion can be determined, non-standard motions appearing in the user motion can be prompted, and the user can correct the motion by himself.

The apparatus further includes:
  a body recognition result acquisition module 460, configured to collect an image in real time, and recognize a body in the collected image to obtain a body recognition result,
  wherein the body recognition results include: whether a body is contained, and a body recognition position; and
  a user motion image capturing module 470, configured to capture, in response to determining that the body recognition result of a target image contains a body, the user motion image from the target image according to the body recognition position matching the target image.

The body recognition result acquisition module 460 is further configured to:
  input the image into a pre-trained body recognition model, to obtain the body recognition results output by the body recognition model;
  wherein the body recognition model is obtained by training a preset deep learning model with training images pre-labeled with body positions.

The user motion image is a color image; and
the three-dimensional recognition coordinate acquisition module 410 includes:
  a heat map set and depth information map set acquisition unit 411, configured to input the user motion image into a pre-trained three-dimensional joint point regression model, to obtain a heat map set of the body key points and a depth information map set of the body key points output by the three-dimensional joint point regression model; and
  a three-dimensional recognition coordinate acquisition unit 412, configured to combine two-dimensional image information of each body key point in the heat map set of the body key points with depth information of each body key point in the depth information map set of the body key points, to obtain the three-dimensional recognition coordinates of the body key points.

The three-dimensional recognition coordinate acquisition module 410 includes:
  a sample image acquisition unit 413, configured to acquire sample images with two-dimensional labels and sample images with three-dimensional labels;
  a first training unit 414, configured to train part of channels in an output layer of a basic three-dimensional joint point regression model, with the sample images with the two-dimensional labels as first inputs, and with a set of joint point heat maps corresponding to the two-dimensional labels as first expected outputs; and
  a second training unit 415, configured to train all of the channels in the output layer of the basic three-dimensional joint point regression model, with the sample images with three-dimensional labels as second inputs, and with a set of joint point heat maps corresponding to the three-dimensional labels as first parts of second expected outputs, and with a set of joint point depth information maps corresponding to the three-dimensional labels as second parts of the second expected outputs, to obtain the three-dimensional joint point regression model.

The user motion determination module 420 includes:
  a reference body key point selecting unit 421, configured to select a reference body key point from the body key points;

a three-dimensional coordinate difference set calculation unit 422, configured to calculate, according to the three-dimensional recognition coordinates, a set of three-dimensional coordinate differences of the body key points relative to the reference body key point; and a user motion determination unit 423, configured to match the set of three-dimensional coordinate differences with sets of standard three-dimensional coordinate differences of respective motions, and determine the user motion matching the user motion image based on the matching result.

The motion prompting module 450 includes:

a distance value calculation unit 451, configured to calculate a distance value between the three-dimensional standard coordinates of the target body key point and the three-dimensional recognition coordinates of the target body key point, and screen a different body key point with a distance value greater than a preset threshold; and a motion prompting unit 452, configured to prompt the motion, based on body position where the different body key point is located, and a degree of deviation between the three-dimensional recognition coordinates of the different body key point and three-dimensional standard coordinates matching the different body key point.

The apparatus further includes:

a standard degree score determination module 480, configured to acquire a plurality of user motion images matching each motion stage respectively, and perform standard degree scoring on the user motion for each user motion image;

a motion score calculation module 490, configured to calculate, according to the scoring results, motion scores corresponding to the motion stages; and a motion progress curve generation module 500, configured to generate a motion progress curve according to the motion scores respectively corresponding to different motion stages.

A person skilled in the art could clearly understand that, for the sake of convenience and briefness in description, the specific working process of the above-described apparatus may be referred to the corresponding process in the aforementioned embodiments of the method, and details are not described herein again.

According to an embodiment of the present disclosure, an electronic device and a readable storage medium are provided.

Figure 5:
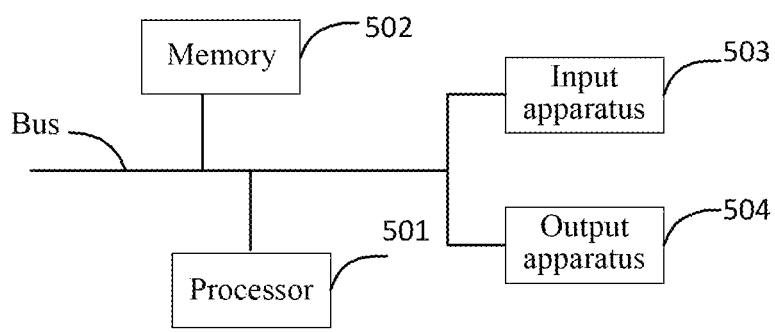
FIG. 5 is a block diagram of an electronic device used to implement the method for prompting a motion according to embodiments of the present disclosure.

As shown in FIG. 5, which is a block diagram of an electronic device of a method for prompting a motion according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit implementation of the present disclosure described and/or claimed herein.

As shown in FIG. 5, the electronic device includes: one or more processors 501, a memory 502, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 5, one processor 501 is used as an example.

The memory 502 is a non-transitory computer readable storage medium provided by the present disclosure. The memory stores instructions executable by at least one processor, so that the at least one processor performs the method for prompting a motion provided by embodiments of the present disclosure. The non-transitory computer readable storage medium of the present disclosure stores computer instructions for causing a computer to perform the method for prompting a motion provided by embodiments of the present disclosure.

The memory 502, as a non-transitory computer readable storage medium, may be used to store non-transitory software programs, non-transitory computer executable programs and modules, such as program instructions/modules corresponding to the method for prompting a motion in embodiments of the present disclosure (for example, the modules shown in FIG. 4). The processor 501 executes the non-transitory software programs, instructions, and modules stored in the memory 502 to execute various functional applications and data processing of the server, that is, to implement the method for prompting a motion in the foregoing method embodiments.

The memory 502 may include a storage program area and a storage data area, where the storage program area may store an operating system and at least one function required application program; and the storage data area may store data created by the use of the electronic device according to the method for prompting a motion, etc. In addition, the memory 502 may include a high-speed random access memory, and may also include a non-transitory memory, such as at least one magnetic disk storage device, a flash memory device, or other non-transitory solid-state storage devices. In some embodiments, the memory 502 may optionally include memories remotely provided with respect to the processor 501, and these remote memories may be connected to the electronic device of the method for prompting a motion through a network. Examples of the above network include but are not limited to the Internet, intranet, local area network, mobile communication network, and combinations thereof.

The electronic device of the method for prompting a motion may further include: an input apparatus 503 and an output apparatus 504. The processor 501, the memory 502, the input apparatus 503, and the output apparatus 504 may be connected through a bus or in other methods. In FIG. 5, connection through a bus is used as an example.

The input apparatus 503 may receive input digital or character information, and generate key signal inputs related to user settings and function control of the electronic device of the method for prompting a motion, such as touch screen, keypad, mouse, trackpad, touchpad, pointing stick, one or more mouse buttons, trackball, joystick and other input apparatuses. The output apparatus 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for prompting a motion, comprising:
acquiring a user motion image, wherein the user motion image is a color image;
inputting the user motion image into a three-dimensional joint point regression model, to obtain a heat map set of body key points and a depth information map set of the body key points output by the three-dimensional joint point regression model;
combining two-dimensional image information of each body key point in the heat map set of the body key points with depth information of each body key point in the depth information map set of the body key points, to obtain three-dimensional recognition coordinates of the body key points;
determining, based on the three-dimensional recognition coordinates, a user motion matching the user motion image;
screening, according to a mapping relationship between the user motion and body key points, a target body key point among all of the recognized body key points;
acquiring three-dimensional standard coordinates of the target body key point corresponding to the user motion; and
prompting a motion based on values of differences between the three-dimensional standard coordinates of the target body key point and the three-dimensional recognition coordinates of the target body key point,
wherein the three-dimensional joint point regression model is obtained by training through:
acquiring sample images with two-dimensional labels and sample images with three-dimensional labels;
training part of channels in an output layer of a basic three-dimensional joint point regression model, with the sample images with the two-dimensional labels as first inputs, and with a set of joint point heat maps corresponding to the two-dimensional labels as first expected outputs; and
training all of the channels in the output layer of the basic three-dimensional joint point regression model to obtain the three-dimensional joint point regression model, with the sample images with three-dimensional labels as second inputs, and with a set of joint point heat maps corresponding to the three-dimensional labels as first parts of second expected outputs, and with a set of joint point depth information maps corresponding to the three-dimensional labels as second parts of the second expected outputs.

2. The method according to claim 1, wherein before acquiring the user motion image, the method further comprises:
recognizing a body in a real-time collected image to obtain a body recognition result,
wherein the body recognition result comprises: whether a body is contained, and a body recognition position; and
in response to determining that the body recognition result of a target image contains a body, capturing the user motion image from the target image according to the body recognition position matching the target image.

3. The method according to claim 2, wherein the recognizing the body in the real-time collected image to obtain the body recognition result, comprises:
inputting the image into a pre-trained body recognition model, to obtain the body recognition result output by the body recognition model,
wherein the body recognition model is obtained by training a preset deep learning model with training images pre-labeled with body positions.

4. The method according to claim 1, wherein the determining, based on the three-dimensional recognition coordinates, a user motion matching the user motion image comprises:
selecting a reference body key point from the body key points;
calculating, based on the three-dimensional recognition coordinates, a set of three-dimensional coordinate differences of the body key points relative to the reference body key point; and
matching the set of three-dimensional coordinate differences with sets of standard three-dimensional coordinate differences of respective motions, and determining the user motion matching the user motion image based on the matching result.

5. The method according to claim 1, wherein prompting the motion based on difference values between the three-dimensional standard coordinates of the target body key point and the three-dimensional recognition coordinates, comprises:
calculating a distance value between the three-dimensional standard coordinates of the target body key point and the three-dimensional recognition coordinates of the target body key point, and screening a different body key point with a distance value greater than a preset threshold; and
prompting the motion, based on body position where the different body key point is located, and a degree of deviation between the three-dimensional recognition coordinates of the different body key point and three-dimensional standard coordinates matching the different body key point.

6. The method according to claim 1, wherein after prompting the motion based on difference values between the three-dimensional standard coordinates of the target body key point and the three-dimensional recognition coordinates, the method further comprises:
acquiring a plurality of user motion images matching each motion stage respectively, and performing standard degree scoring on the user motion for each user motion image;
calculating, according to the scoring results, motion scores corresponding to the motion stages; and
generating a motion progress curve according to the motion scores respectively corresponding to different motion stages.

7. An electronic device, comprising:
at least one processor; and
a memory communicatively connected with the at least one processor;
wherein, the memory stores instructions executable by the at least one processor, and the instructions, when executed by the at least one processor, causes the at least one processor to execute operations comprising:
acquiring a user motion image, wherein the user motion image is a color image;
inputting the user motion image into a three-dimensional joint point regression model, to obtain a heat map set of body key points and a depth information map set of the body key points output by the three-dimensional joint point regression model;
combining two-dimensional image information of each body key point in the heat map set of the body key points with depth information of each body key point in the depth information map set of the body key points, to obtain three-dimensional recognition coordinates of the body key points;
determining, based on the three-dimensional recognition coordinates, a user motion matching the user motion image;
screening, according to a mapping relationship between the user motion and body key points, a target body key point among all of the recognized body key points;
acquiring three-dimensional standard coordinates of the target body key point corresponding to the user motion; and
prompting a motion based on values of differences between the three-dimensional standard coordinates of the target body key point and the three-dimensional recognition coordinates of the target body key point,
wherein the three-dimensional joint point regression model is obtained by training through:
acquiring sample images with two-dimensional labels and sample images with three-dimensional labels;
training part of channels in an output layer of a basic three-dimensional joint point regression model, with the sample images with the two-dimensional labels as first inputs, and with a set of joint point heat maps corresponding to the two-dimensional labels as first expected outputs; and
training all of the channels in the output layer of the basic three-dimensional joint point regression model to obtain the three-dimensional joint point regression model, with the sample images with three-dimensional labels as second inputs, and with a set of joint point heat maps corresponding to the three-dimensional labels as first parts of second expected outputs, and with a set of joint point depth information maps corresponding to the three-dimensional labels as second parts of the second expected outputs.

8. The electronic device according to claim 7, wherein before acquiring the user motion image, the operations further comprise:

recognizing a body in a real-time collected image to obtain a body recognition result, wherein the body recognition result comprises: whether a body is contained, and a body recognition position; and in response to determining that the body recognition result of a target image contains a body, capturing the user motion image from the target image according to the body recognition position matching the target image.

9. The electronic device according to claim 8, wherein the recognizing the body in the real-time collected image to obtain the body recognition result, comprises:

inputting the image into a pre-trained body recognition model, to obtain the body recognition result output by the body recognition model, wherein the body recognition model is obtained by training a preset deep learning model with training images pre-labeled with body positions.

10. The electronic device according to claim 7, wherein the determining, based on the three-dimensional recognition coordinates, a user motion matching the user motion image comprises:

selecting a reference body key point from the body key points;

calculating, based on the three-dimensional recognition coordinates, a set of three-dimensional coordinate differences of the body key points relative to the reference body key point; and matching the set of three-dimensional coordinate differences with sets of standard three-dimensional coordinate differences of respective motions, and determining the user motion matching the user motion image based on the matching result.

11. The electronic device according to claim 7, wherein prompting the motion based on difference values between the three-dimensional standard coordinates of the target body key point and the three-dimensional recognition coordinates, comprises:

calculating a distance value between the three-dimensional standard coordinates of the target body key point and the three-dimensional recognition coordinates of the target body key point, and screening a different body key point with a distance value greater than a preset threshold; and prompting the motion, based on body position where the different body key point is located, and a degree of deviation between the three-dimensional recognition coordinates of the different body key point and three-dimensional standard coordinates matching the different body key point.

12. The electronic device according to claim 7, wherein after prompting the motion based on difference values between the three-dimensional standard coordinates of the target body key point and the three-dimensional recognition coordinates, the operations further comprise:

acquiring a plurality of user motion images matching each motion stage respectively, and performing standard degree scoring on the user motion for each user motion image;

calculating, according to the scoring results, motion scores corresponding to the motion stages; and generating a motion progress curve according to the motion scores respectively corresponding to different motion stages.

13. A non-transitory computer-readable storage medium storing computer instructions, wherein the computer instructions are used for a computer to execute operations comprising:

acquiring a user motion image, wherein the user motion image is a color image;

inputting the user motion image into a three-dimensional joint point regression model, to obtain a heat map set of body key points and a depth information map set of the body key points output by the three-dimensional joint point regression model;

combining two-dimensional image information of each body key point in the heat map set of the body key points with depth information of each body key point in the depth information map set of the body key points, to obtain three-dimensional recognition coordinates of the body key points;

determining, based on the three-dimensional recognition coordinates, a user motion matching the user motion image;

screening, according to a mapping relationship between the user motion and body key points, a target body key point among all of the recognized body key points;

acquiring three-dimensional standard coordinates of the target body key point corresponding to the user motion; and prompting a motion based on values of differences between the three-dimensional standard coordinates of the target body key point and the three-dimensional recognition coordinates of the target body key point, wherein the three-dimensional joint point regression model is obtained by training through:

acquiring sample images with two-dimensional labels and sample images with three-dimensional labels;

training part of channels in an output layer of a basic three-dimensional joint point regression model, with the sample images with the two-dimensional labels as first inputs, and with a set of joint point heat maps corresponding to the two-dimensional labels as first expected outputs; and training all of the channels in the output layer of the basic three-dimensional joint point regression model to obtain the three-dimensional joint point regression model, with the sample images with three-dimensional labels as second inputs, and with a set of joint point heat maps corresponding to the three-dimensional labels as first parts of second expected outputs, and with a set of joint point depth information maps corresponding to the three-dimensional labels as second parts of the second expected outputs.

14. The medium according to claim 13, wherein before acquiring the user motion image, the operations further comprise:

recognizing a body in a real-time collected image to obtain a body recognition result, wherein the body recognition result comprises: whether a body is contained, and a body recognition position; and in response to determining that the body recognition result of a target image contains a body, capturing the user motion image from the target image according to the body recognition position matching the target image.

15. The medium according to claim 14, wherein the recognizing the body in the real-time collected image to obtain the body recognition result, comprises:

inputting the image into a pre-trained body recognition model, to obtain the body recognition result output by the body recognition model, wherein the body recognition model is obtained by training a preset deep learning model with training images pre-labeled with body positions.

* * * * *